US008888649B2

(12) United States Patent
Scekic et al.

(10) Patent No.: US 8,888,649 B2
(45) Date of Patent: Nov. 18, 2014

(54) DYNAMIC REDUCTION-RATIO HOISTING DEVICE

(75) Inventors: Vladimir Scekic, New Westminster (CA); Russell Turnbull, Coquitlam (CA); Daniel Constantin Popa, Vancouver (CA); Soegi Hartono, Coquitlam (CA)

(73) Assignee: MiVa Engineering Ltd., New Westminster (CA)

( * ) Notice: Subject to any disclaimer, the term of this patent is extended or adjusted under 35 U.S.C. 154(b) by 12 days.

(21) Appl. No.: 13/116,196

(22) Filed: May 26, 2011

(65) Prior Publication Data

US 2012/0302387 A1 Nov. 29, 2012

(51) Int. Cl.
*F16H 3/44* (2006.01)
*B66B 11/04* (2006.01)
*F16H 37/08* (2006.01)

(52) U.S. Cl.
CPC ........ *B66B 11/0453* (2013.01); *F16H 37/0826* (2013.01)
USPC .......................................... 475/288; 475/154

(58) Field of Classification Search
USPC ........................ 475/150, 154, 157, 288, 311
See application file for complete search history.

(56) References Cited

U.S. PATENT DOCUMENTS

| 1,802,763 | A | * | 4/1931 | Hild .................................. 173/9 |
| 1,848,351 | A | * | 3/1932 | Keim ................................ 475/6 |
| 4,434,972 | A | | 3/1984 | Charles |
| 5,788,058 | A | * | 8/1998 | Girardey ...................... 198/813 |
| 6,379,276 | B1 | * | 4/2002 | Cheng ............................... 475/4 |
| 7,481,730 | B2 | * | 1/2009 | Pesiridis et al. .................. 475/5 |
| 7,625,307 | B2 | * | 12/2009 | Usoro ............................... 475/5 |
| 2008/0176696 | A1 | * | 7/2008 | Bucknor et al. ................. 475/5 |

FOREIGN PATENT DOCUMENTS

| DE | 4031400 A1 | 9/1991 |
| JP | 2006096500 A | 4/2006 |
| RU | 2225350 C2 | 3/2004 |

* cited by examiner

*Primary Examiner* — Justin Holmes
(74) *Attorney, Agent, or Firm* — Oyen Wiggs Green & Mutala LLP

(57) ABSTRACT

A hoisting device including a cable drum, a first motor, a second motor and a gear assembly is provided. The gear assembly includes a first epicyclic and a second epicyclic. The first epicyclic includes a first carrier rotationally connected to the cable drum, a first sun rotationally connected to the first motor, a first annulus, and a first planet in meshing engagement with the first sun and the first annulus. The second epicyclic includes a second carrier rotationally grounded, a second sun rotationally connected to the second motor, a second annulus connected to the first annulus, and a second planet in meshing engagement with the second sun and the second annulus.

14 Claims, 5 Drawing Sheets

DYNAMIC REDUCTION-RATIO HOISTING DEVICE

TECHNICAL FIELD

This invention relates to hoisting devices and, more particularly, to multi-motor hoisting devices.

BACKGROUND

Hoisting devices, such as drawworks, need to satisfy multiple design criteria including maximum lift capacity and maximum speed of empty or near-empty loads. These two criteria are antagonistic under current design practices since high lift capacity requires relatively high reduction ratios while high hoisting speed requires low reduction ratios.

Compromise between the two requirements is often found in multi-speed hoisting device designs, where low-speed reduction ratios are used for slow lifting of heavy loads, while high-speed ratios are used for moving relatively light loads or empty loads at relatively high speeds.

This compromise approach, however, does not address the need for redundancy of hoisting capacity in case of a motor failure. Namely, if one motor of a multi-motor hoisting device fails, hoisting speed(s) will not be affected, but the hoisting capacity will be lowered proportionally. For example, with a two-motor hoisting device, if one motor fails, hoisting capacity would be halved. However, hoisting capacity should be prioritized over hoisting speed because the ability to lift a full load is more important than the ability to lift half of the load at full speed.

There is a need for hoisting devices with fail-safe lifting capacity, with optimal performance when all motors are fully operational, and with the ability to maintain full hoisting capacity (albeit with a loss of hoisting speed) in case of a motor failure.

SUMMARY

The following embodiments and aspects thereof are described and illustrated in conjunction with apparatus and methods which are meant to be exemplary and illustrative, not limiting in scope. In various embodiments, one or more of the above-described problems have been reduced or eliminated, while other embodiments are directed to other improvements.

One aspect provides a hoisting device including a cable drum, a first motor, a second motor and a gear assembly. The gear assembly includes a first epicyclic and a second epicyclic. The first epicyclic includes a first carrier rotationally connected to the cable drum, a first sun rotationally connected to the first motor, a first annulus, and a first planet in meshing engagement with the first sun and the first annulus. The second epicyclic includes a second carrier rotationally grounded, a second sun rotationally connected to the second motor, a second annulus connected to the first annulus, and a second planet in meshing engagement with the second sun and the second annulus.

The first annulus and the second annulus may be integral and form a common annulus. The first annulus and the second annulus may be rotationally connected. The first annulus and the second annulus may be rotationally connected by a gear train. A total geometric reduction ratio for each torque path from each of the first motor to the cable drum and the second motor to the cable drum may provide for maximum design hook-load with only one of the first motor or the second motor running. The first epicyclic and second epicyclic may be symmetrical, where key geometric values such as number of teeth of respective components between the two epicyclics are equal. A first braking means may be provided for preventing rotation of the first sun if the first motor is not running. A second braking means may be provided for preventing rotation of the second sun if the second motor is not running. The first motor and the second motor may be operable in the same and opposite directions. The first epicyclic and the second epicyclic may be concentrically arranged. The second sun may be disposed on a hollow shaft and the first sun may be disposed on a first motor shaft extending through the hollow shaft.

A gear train may rotationally connect the second sun to the second motor. The gear train may include a proximal gear fixed to the hollow shaft and a distal gear fixed to a second motor shaft. The gear assembly may include a third epicyclic rotationally connecting the first carrier to the cable drum, wherein the first carrier is in meshing engagement with a third sun of the third epicyclic. The second carrier may be fixed to a housing of the hoisting device.

In addition to the exemplary aspects and embodiments described above, further aspects and embodiments will become apparent by reference to the drawings and by study of the following detailed descriptions.

BRIEF DESCRIPTION OF THE FIGURES

Exemplary embodiments are illustrated in referenced figures of the drawings. It is intended that the embodiments and figures disclosed herein are to be considered illustrative rather than restrictive.

DETAILED DESCRIPTION

The invention provides a hoisting device with a dynamic reduction ratio gear assembly. The hoisting devices of the invention have redundant hoisting capacity and in some embodiments feature two-motor designs with paired epicyclical gear systems.

The term "hoisting device" as used herein refers to any device used to hoist a load and lower a load, such as drawworks and the like. The term "rotationally connected" as used herein refers to both direct and indirect rotational connections. A direct connection may include, for example, meshing engagement between teeth of respective gears. An indirect rotational connection may include, for example, connection through a gear train or the like.

Figure 1:
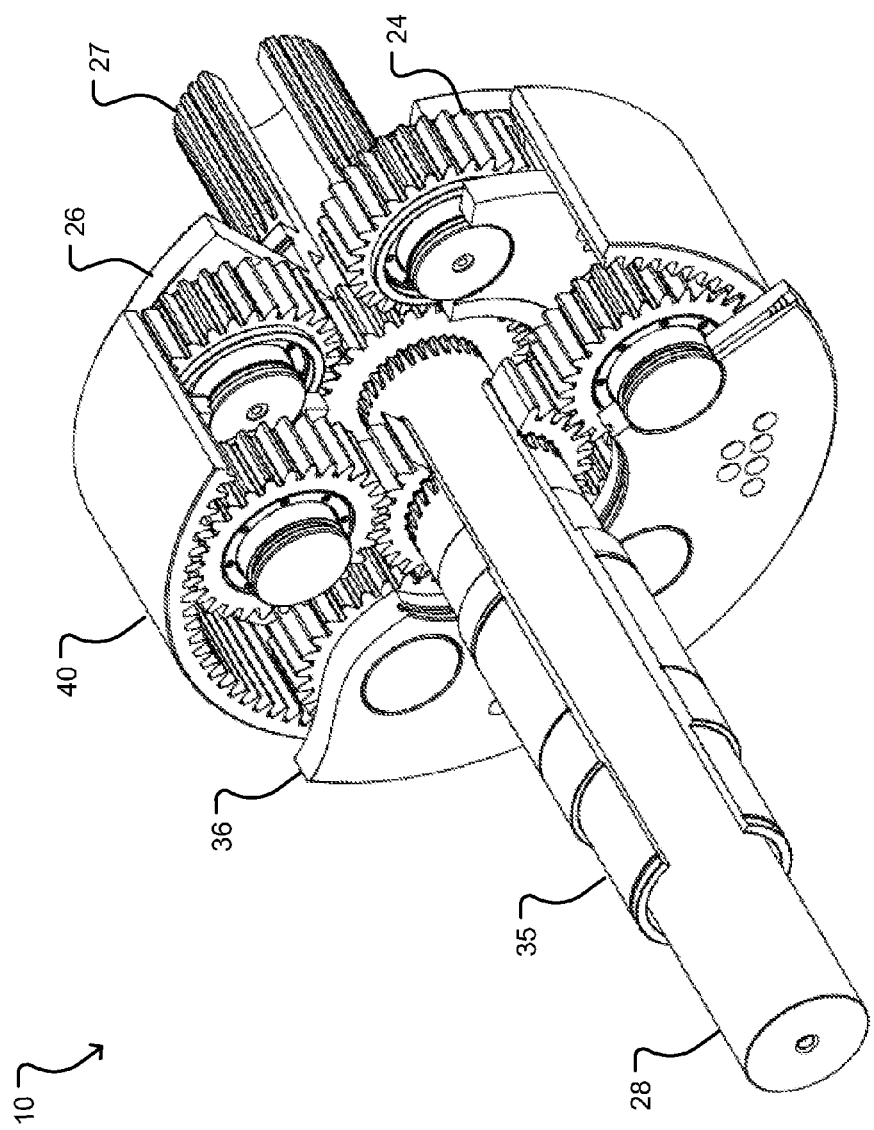
FIG. 1 shows a cutaway perspective view of a hoisting device gear assembly according to one embodiment of the invention.
Figure 2:
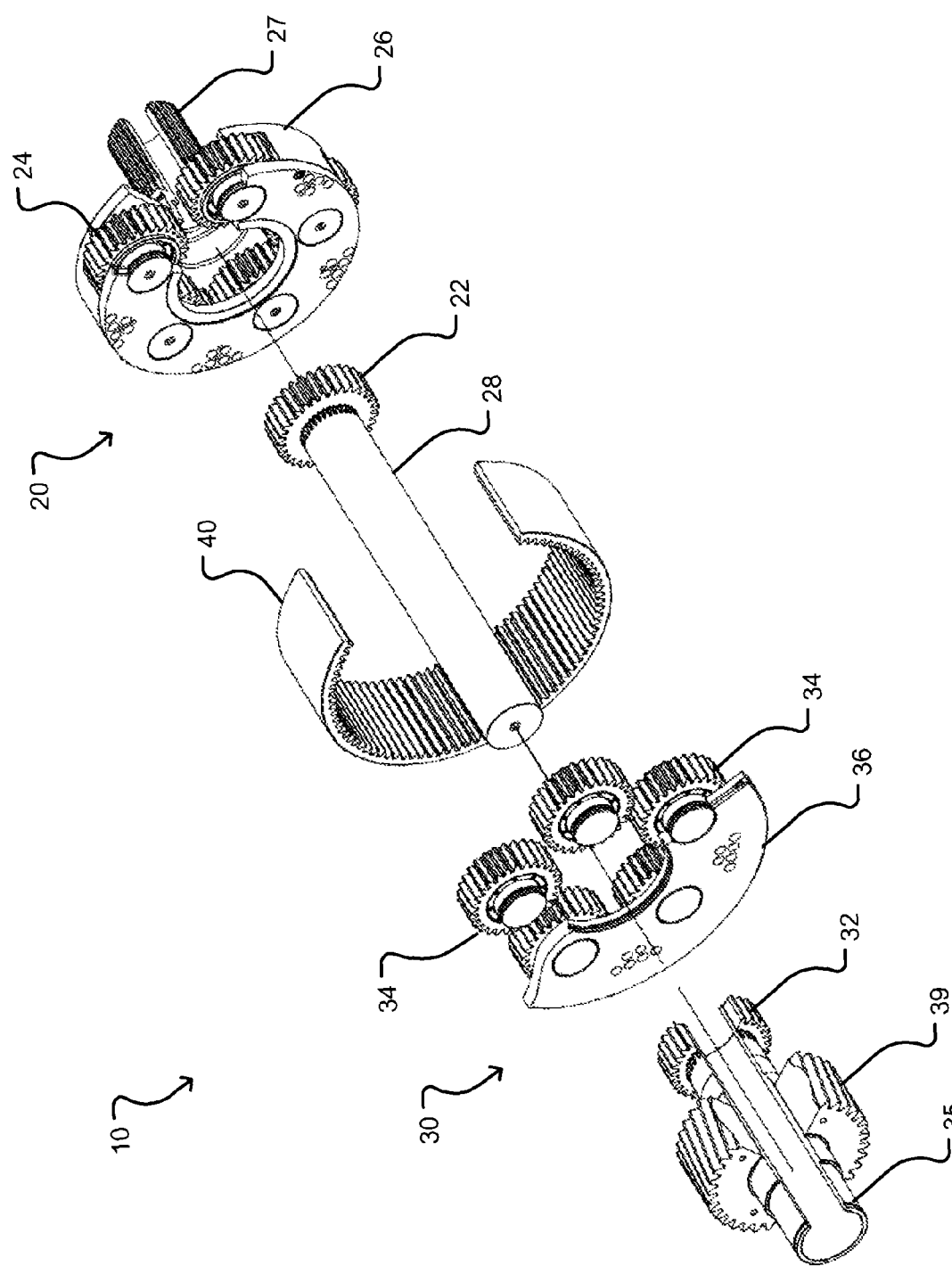
FIG. 2 shows a partially exploded perspective view of the hoisting device gear assembly shown in FIG. 1.
Figure 3:
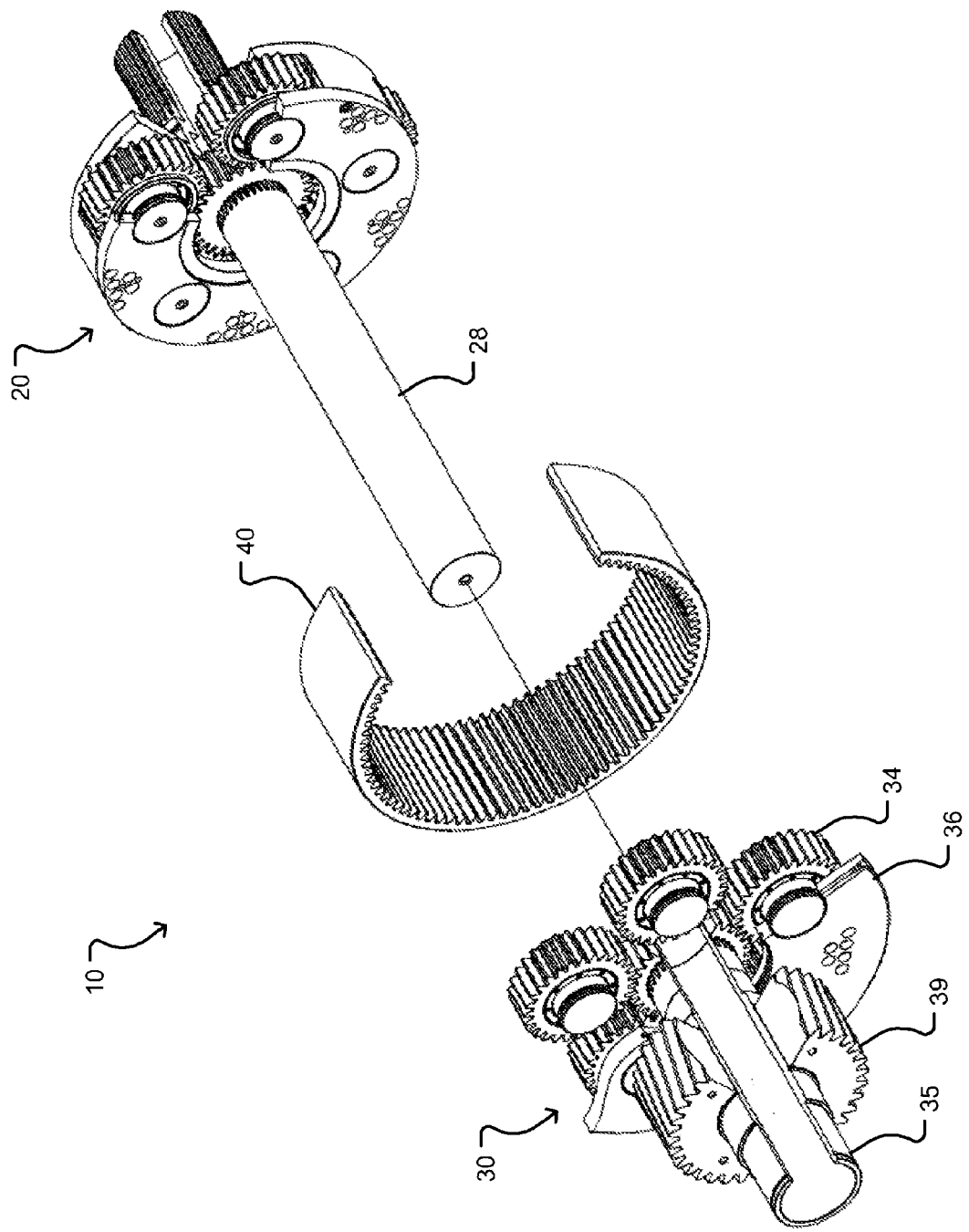
FIG. 3 shows a partially exploded perspective view of the hoisting device gear assembly shown in FIG. 1.

FIGS. 1 to 3 show a hoisting device gear assembly 10 according to one embodiment of the invention. Hoisting device assembly 10 includes a main epicyclic 20 and control epicyclic 30.

Main carrier 26 is rotationally connected to a cable drum (not shown) through pinion-like extension 27 of main carrier 26. Main sun 22 is meshingly engaged with main planets 24. Main sun 22 is also rotationally connected to a first motor (not shown). In the illustrated embodiment, this connection includes a main shaft 28 fixed to main sun 22. Control carrier 36 is rotationally grounded or fixed, making control epicyclic 30 a de facto "star arrangement". Control carrier 36 may for example be fixed to a housing (not shown) of the hoisting device. Control sun 32 is meshingly engaged with control planets 34. Control sun 32 is also rotationally connected to a second motor (not shown). In the illustrated embodiment, this connection includes a hollow shaft 35 fixed to control sun 32. A control gear train 39 in rotational connection with the second motor is also fixed to hollow shaft 35.

In the illustrated embodiment, compact, axial alignment between main epicyclic 20 and control epicyclic 30 is achieved by having main shaft 28 extend through hollow shaft 35 which itself extends through control epicyclic 30.

Common annulus 40 rotationally connects main epicyclic 20 to control epicyclic 30 by meshing engagement with main planets 24 and control planets 34. In other embodiments each of the main epicyclic 20 and control epicyclic 30 may have corresponding annuli which in turn are rotationally connected to each other.

Figure 4:
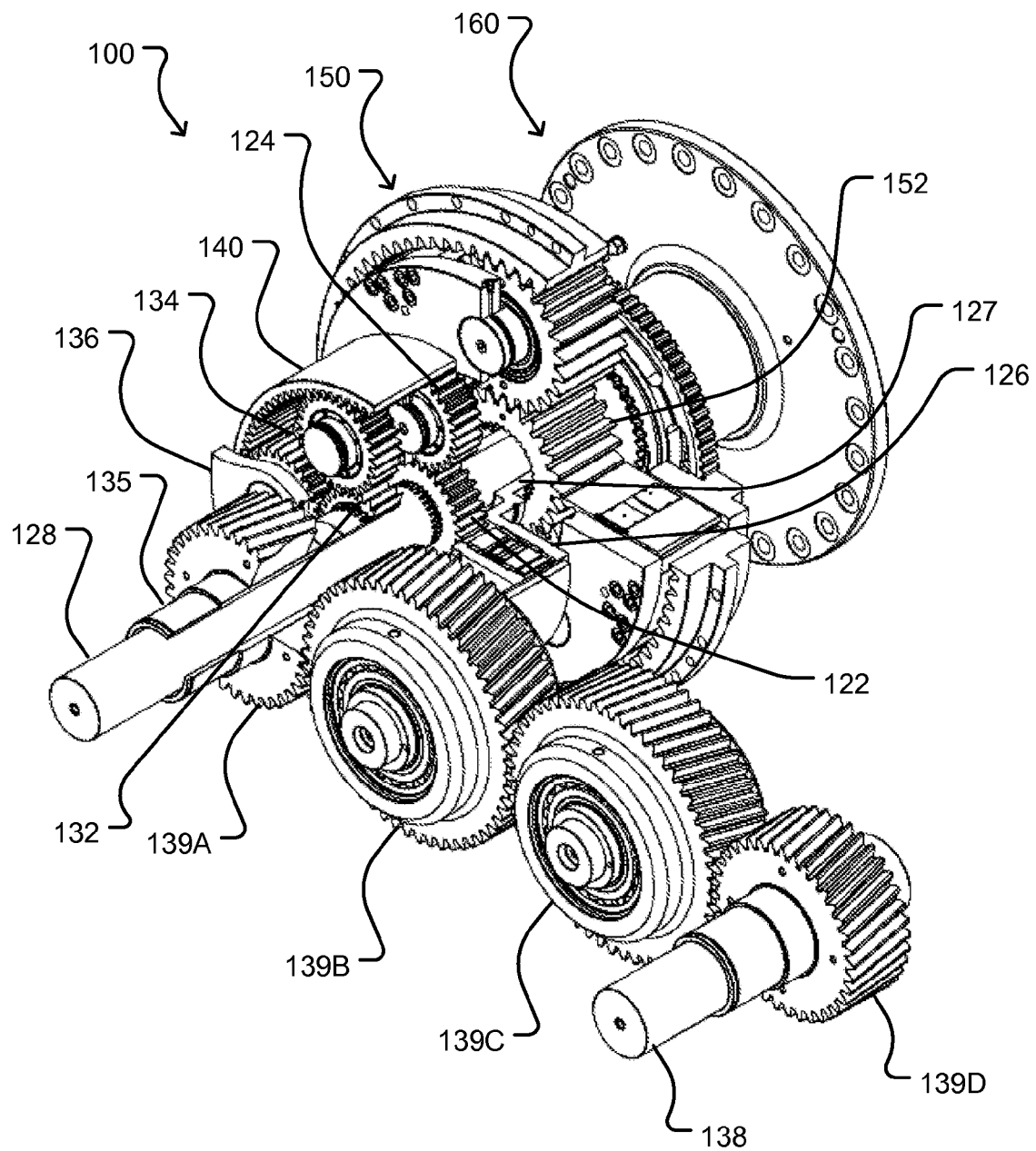
FIG. 4 shows a cutaway perspective view of a hoisting device gear assembly according to one embodiment of the invention.
Figure 5:
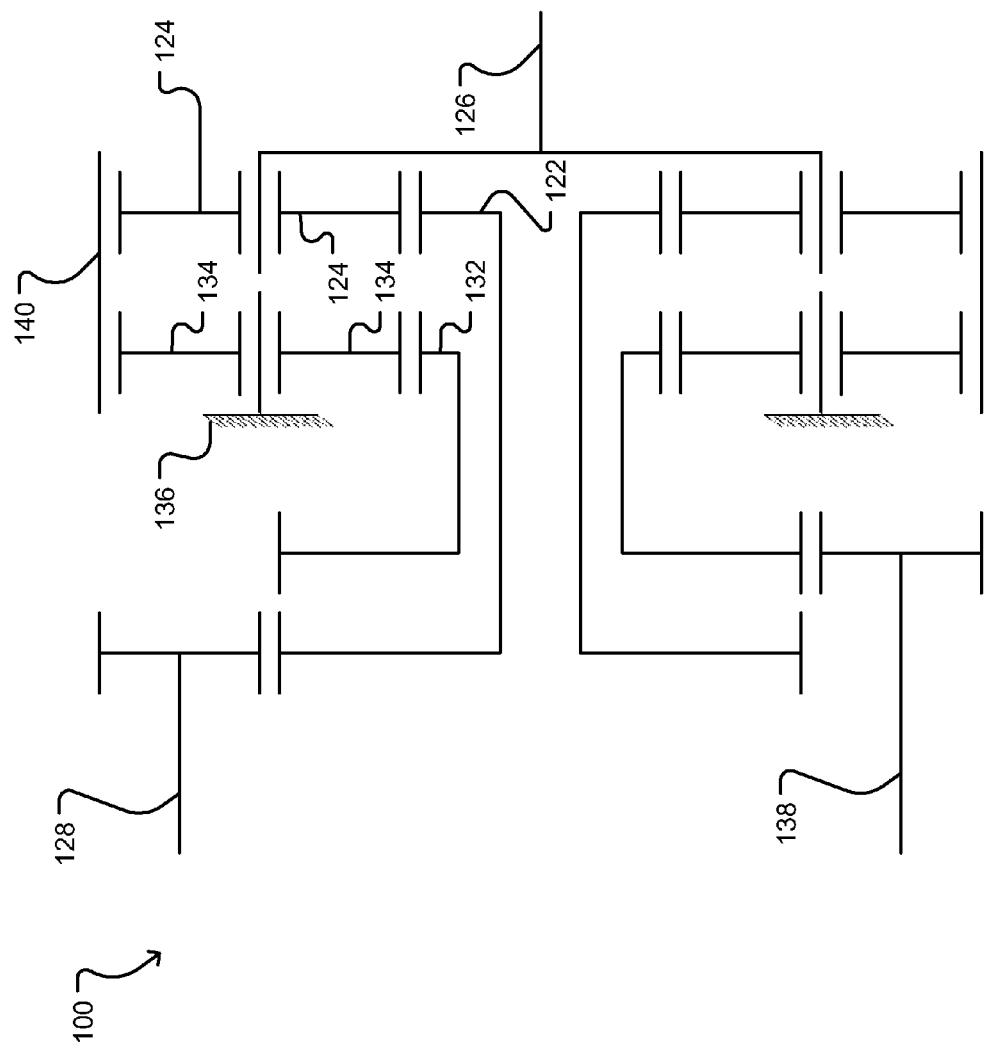
FIG. 5 shows a schematic view of the hoisting device gear assembly shown in FIG. 4.

FIGS. 4 and 5 show a hoisting device gear assembly 100 according to another embodiment of the invention. Hoisting device gear assembly 100 is similar to hoisting device gear assembly 10. Main sun 122, main planets 124, main carrier 126, pinion-like extension 127, main shaft 128, control sun 132, control planets 134, hollow shaft 135, and control carrier 136 have similar functions to corresponding components of hoisting gear assembly 10. Hoisting device gear assembly 100 also includes a gear train 139A, 139B, 139C, 139D and control shaft 138 for rotationally connecting control sun 132 to the second motor (not shown). Hoisting device gear assembly 100 also includes a final reduction epicyclic 160 for connecting main carrier 126 to cable drum 160. In particular, pinion-like extension 127 of main carrier 126 meshingly engages inner teeth of sun 152 of final reduction epicyclic 160.

In the embodiments described above, the total geometric reduction ratio for respective torque paths from the first motor to the cable drum and the second motor to the cable drum provides maximum design hook-load with just one of either of the two motors running.

Some embodiments may have full and symmetrical redundancy, wherein the main epicyclic and control epicyclic possess identical key geometric values (e.g. number of teeth of respective components). Other embodiments may be asymmetrical.

According to the above-described embodiments, annulus rotational speed will be determined by the rotational speed of the control sun and will be equal to:

$$w_A = w_{s1} * N_{s1}/N_{a1}, \text{where:}$$

$w_A$—is the rotational speed of the annulus,
$w_{s1}$—is the rotational speed of the control sun,
$N_{a1}$—is the number of teeth of annulus on the control epicyclic side and,
$N_{s1}$—is the number of teeth of the control sun.

The dynamic reduction ratio of the main epicyclic, defined as the (rotational speed of the main sun) divided by the (rotational speed of the main carrier) can mathematically be described as follows:

$$i_{md} = w_{s2}(N_{a2}+N_{s2})/(N_{a2}*w_A+N_{s2}*w_{s2}), \text{where:}$$

$i_{md}$—is the dynamic reduction ratio relative to the main sun,
$w_{s2}$—is the rotational speed of main sun,
$w_A$—is the rotational speed of the annulus,
$N_{a2}$—is the number of teeth of annulus gear on the main epicyclic side, and
$N_{s2}$—is the number of teeth of main sun.

Combining the two equations, we come to:

$$i_{md} = w_{s2}(N_{a2}+N_{s2})/(w_A*N_{a2}+w_{s2}*N_{s2}).$$

The dynamic reduction ratio of the control epicyclic, defined as the (rotational speed of the control sun) divided by the (rotational speed of the main carrier), is a two-step process and can mathematically be described as follows:

$$i_{cd} = N_{a1}/N_{s1} * w_A * (N_{a2}+N_{s2})/(N_{a2}*w_A+N_{s2}*w_{s2}),$$

where:

$i_{cd}$—is the dynamic reduction ratio relative to the control sun,
$w_{s2}$—is the rotational speed of main sun,
$w_A$—is the rotational speed of the annulus,
$N_{a1}$—is the number of teeth of annulus on control epicyclic side,
$N_{a2}$—is the number of teeth of annulus on main epicyclic side,
$N_{s1}$—is the number of teeth of control sun, and
$N_{s2}$—is the number of teeth of main sun.

When simplified, the above equation can read:

$$i_{cd} = w_{s1}(N_{a2}+N_{s2})/(w_{s1}*N_{s1}+w_{s2}*N_{s2})$$

The above equations at [0028] and [0030] are universal equations. For the special case of "symmetrical" epicyclics where key geometric values such as number of teeth of respective components between the two epicyclics are equal, these equations become:

$$i_{md} = w_{s2}(N_a+N_s)/(N_s(w_{s1}+w_{s2})), \text{ and,}$$

$$i_{cd} = w_{s1}(N_a+N_s)/(N_s(w_{s1}+w_{s2})).$$

$i_{md}$—is the dynamic reduction ratio relative to the main sun,
$i_{cd}$—is the dynamic reduction ratio relative to the control sun,
$w_{s2}$—is the rotational speed of the main sun,
$w_{s1}$—is the rotational speed of the control sun,
$N_a$—is the number of teeth of the annulus,
$N_s$—is the number of teeth of the main sun.

The above equations can be understood in simpler terms as follows. If rotational speed of either sun is zero (0), the dynamic reduction ratio defined as the (rotational speed of the other sun) divided by the (rotational speed of the main carrier), will be equivalent to a simple planetary design, i.e.:

$$i = N_a/N_s + 1$$

If rotational speed of the two suns is equal in both, magnitude and direction ($w_{s1} = w_{s2}$), the dynamic reduction ratio defined as the (rotational speed of the main sun) divided by the (rotational speed of the main carrier), will be equivalent to one half (½) of a simple planetary design, i.e.:

$$i = (N_a/N_s + 1)/2$$

If rotational speed of the two suns is equal in intensity but opposite in direction ($w_{s1} = -w_{s2}$), the dynamic reduction ratio defined as the (rotational speed of the main sun) divided by the (rotational speed of the main carrier), will be infinite (rotational speed of the main carrier will be zero (0).

The foregoing can be put in other terms as follows.

If both motors are fully functional, any given load can be hoisted at twice the speed available with a single motor; the two suns would rotate in same direction.

If any of the two motors became unavailable, full load can still be hoisted but at reduced speed; the sun connected to the unavailable motor would have to be prevented from rotation by mechanical braking means.

If both motors are available, and there is desire to move a heavy load very slowly, the two motors can be operated at relatively high, different speeds close to best motor efficiency, in opposite directions; the main carrier will then rotate very slowly while motors will operate with better efficiency and better resolution from a control point of view.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A hoisting device comprising:
    a cable drum;
    a first motor;
    a second motor; and
    a gear assembly comprising a first epicyclic and a second epicyclic,
        the first epicyclic comprising:
            a first carrier rotationally connected to the cable drum;
            a first sun rotationally connected to the first motor;
            a first annulus;
            a first planet in meshing engagement with the first sun and the first annulus;
        the second epicyclic comprising:
            a second carrier rotationally grounded;
            a second sun rotationally connected to the second motor;
            a second annulus connected to the first annulus; and
            a second planet in meshing engagement with the second sun and the second annulus;
    wherein the first motor and the second motor are operable only as motors in the same or opposite directions;
    wherein the hoisting device is a drawworks.

2. A hoisting device according to claim 1 wherein the first annulus and the second annulus are integral and form a common annulus.

3. A hoisting device according to claim 2 wherein the first annulus and the second annulus are rotationally connected.

4. A hoisting device according to claim 3 wherein the first annulus and the second annulus are rotationally connected by a gear train.

5. A hoisting device according to claim 2 wherein a total geometric reduction ratio for each torque path from each of the first motor to the cable drum and the second motor to the cable drum provides for maximum design hook-load with only one of the first motor or the second motor running.

6. A hoisting device according to claim 5 wherein the first epicyclic and second epicyclic are symmetrical.

7. A hoisting device according to claim 6 further comprising a first braking means for preventing rotation of the first sun if the first motor is not running.

8. A hoisting device according to claim 7 further comprising a second braking means for preventing rotation of the second sun if the second motor is not running.

9. A hoisting device according to claim 1 wherein the first epicyclic and the second epicyclic are concentrically arranged.

10. A hoisting device according to claim 9 wherein the second sun is disposed on a hollow shaft and the first sun is disposed on a first motor shaft extending through the hollow shaft.

11. A hoisting device according to claim 10 comprising a gear train rotationally connecting the second sun to the second motor.

12. A hoisting device according to claim 11 wherein the gear train comprises a proximal gear fixed to the hollow shaft and a distal gear fixed to a second motor shaft.

13. A hoisting device according to claim 12 wherein the gear assembly further comprises a third epicyclic rotationally connecting the first carrier to the cable drum, wherein the first carrier is in meshing engagement with a third sun of the third epicyclic, the third sun is in meshing engagement with a third planet of the third epicyclic, the third planet is in meshing engagement with a rotationally grounded third annulus of the third epicyclic and connected to a third carrier of the third epicyclic, and the third carrier is in meshing engagement with the cable drum.

14. A hoisting device according to claim 13 wherein the second carrier is fixed to a housing of the hoisting device.

* * * * *